United States Patent
Krieg et al.

(10) Patent No.: US 6,450,506 B1
(45) Date of Patent: Sep. 17, 2002

(54) SEALING SYSTEM FOR PROVIDING A GAP-FREE SEAL BETWEEN STATIONARY STRUCTURAL PARTS

(75) Inventors: Dieter Krieg, Bartholomä; Elmar Pongratz, Mutlangen, both of (DE)

(73) Assignee: SeitzSchenk Filtersystems GmbH, Bad Kreuznach (DE)

(*) Notice: Subject to any disclaimer, the term of this patent is extended or adjusted under 35 U.S.C. 154(b) by 0 days.

(21) Appl. No.: 09/807,669

(22) PCT Filed: Oct. 1, 1999

(86) PCT No.: PCT/EP99/07305
§ 371 (c)(1),
(2), (4) Date: Apr. 13, 2001

(87) PCT Pub. No.: WO00/22325
PCT Pub. Date: Apr. 20, 2000

(30) Foreign Application Priority Data

Oct. 13, 1998 (DE) .......................... 198 47 207

(51) Int. Cl.⁷ ................................................ F16J 15/06
(52) U.S. Cl. ...................... 277/608; 277/609; 277/630
(58) Field of Search ................. 277/602, 608, 277/609, 614, 630, 643

(56) References Cited

U.S. PATENT DOCUMENTS

| | | | | |
|---|---|---|---|---|
| 2,926,937 A | * | 3/1960 | Parsons | 277/641 |
| 4,303,251 A | * | 12/1981 | Harra et al. | 277/614 |
| 6,039,319 A | * | 3/2000 | Coonce et al. | 277/314 |
| 6,231,049 B1 | * | 5/2001 | Ridgway | 277/594 |
| 6,234,545 B1 | * | 5/2001 | Babuder et al. | 277/608 |

* cited by examiner

Primary Examiner—Anthony Knight
Assistant Examiner—John L. Beres
(74) Attorney, Agent, or Firm—Gudrun E. Huckett

(57) ABSTRACT

A sealing system for a gap-free seal for a product chamber has a first structural part having a first flange surface and a first sealing surface. It further has a second structural part having a second flange surface and a second sealing surface. The first and second structural parts are connected to one another via the first and second flange surfaces and form a component of the product chamber. At least one sealing element is inserted between the first structural part and the second structural part and rests against the first and second sealing surfaces without a gap remaining between first and second structural parts. The first and second sealing surfaces are turned so as to be swirl-free. The first and second flange surfaces have a burr-free transition into the first and second sealing surfaces, respectively, and the burr-free transitions provide a sealing line.

9 Claims, 2 Drawing Sheets

SEALING SYSTEM FOR PROVIDING A GAP-FREE SEAL BETWEEN STATIONARY STRUCTURAL PARTS

BACKGROUND OF THE INVENTION

1. Field of the Invention

The invention relates to a detachable, gap-free sealing system between stationary structural parts, in particular, an aseptic sealing system for sealing a product chamber, with at least one first structural part and a second structural part, wherein both structural parts are connected to one another, and with at least one sealing element inserted between the first structural part and the second structural part.

2. Description of the Related Art

Connections with seals are known in many variations as flat packing or shaped seals wherein the sealing flanges are provided with a smooth working ledge, with tongue and groove, or with turned grooves of different cross-section. The sealing elements are comprised of different materials such as wood pulp, paper, rubber, plastic materials, or metals such as soft copper, aluminum or soft iron. A sealing system for a gap-free seal between stationary structural parts as a pipe flange connection can be taken from DIN (German Industrial Standard) 11864, part 2. Two embodiments of an aseptic flange connection with an O-ring and a shaped seal as the sealing element can be taken from this document. The flanges are provided with almost semi-circular or rectangular turned grooves positioned closely below the flange surfaces facing the product chamber. In order for the sealing elements to be inserted into a flange part, the flanges are provided with tongues which are precision-fitted into grooves of the respective second flange part. The turned grooves in which the sealing elements are anchored, are formed as recesses on the product chamber side of the flange. This results in a gap oriented toward the product chamber which is closed toward the product chamber by the yielding of the sealing element. The illustrated sealing systems require very high precision of the flanges, in particular, when shaped seals are to be used. The shaped seals themselves must be very precisely dimensioned. Moreover, high initial compression forces result in these embodiments of the flanges.

SUMMARY OF THE INVENTION

It is an object of the invention to provide a sealing system for a gap-free seal between stationary structural parts, in particular, an aseptic sealing system, for sealing a product chamber, which is suitable for sealing any desired components of containers and pipelines.

This object is solved according to the invention in that the two structural parts are connected by a flange-like connection and the sealing element provides a gap-free arrangement between the first structural part and the second structural part.

In the context of the present invention it is provided to realize an aseptic, gap-free sealing system which is suitable for a gap-free connection of pipes as well as for connecting structural apparatus parts such as, for example, a bottom of a single-layer filter with its wall. The gap-free, aseptic sealing system should be useable independent of the angle at which the connected structural apparatus parts, container structural parts, or pipe structural parts are positioned relative to one another, and should not have any dead spaces from which the product cannot be cleaned in a simple way. According to the invention, this is achieved by the arrangement of the sealing element closer to the flange surfaces that comes into contact with the product. The turned groove receiving the sealing element in the structural flange part is designed such that a recess is produced in one structural part by turning and a projection is produced in the other structural part by turning. When the two structural parts are connected to one another, without the sealing element being present, a deliberately large gap results in the direction of the product chamber which is closed only after insertion of the sealing element. In this way, it is ensured that, when the structural parts are assembled and the sealing element is inserted, there is no gap remaining between the structural parts at the side of the product chamber. In this way, aseptic conditions, for example, also at the right-angle connecting location of sidewall and bottom of a single-layer filter are possible because this area can be sealed effectively by the sealing element relative to the hollow space for guiding or containing the product.

BRIEF DESCRIPTION OF THE DRAWINGS

Embodiments of the subject matter of the invention are illustrated in the drawings.

It is shown in.

DESCRIPTION OF THE PREFERRED EMBODIMENTS

Figure 1:
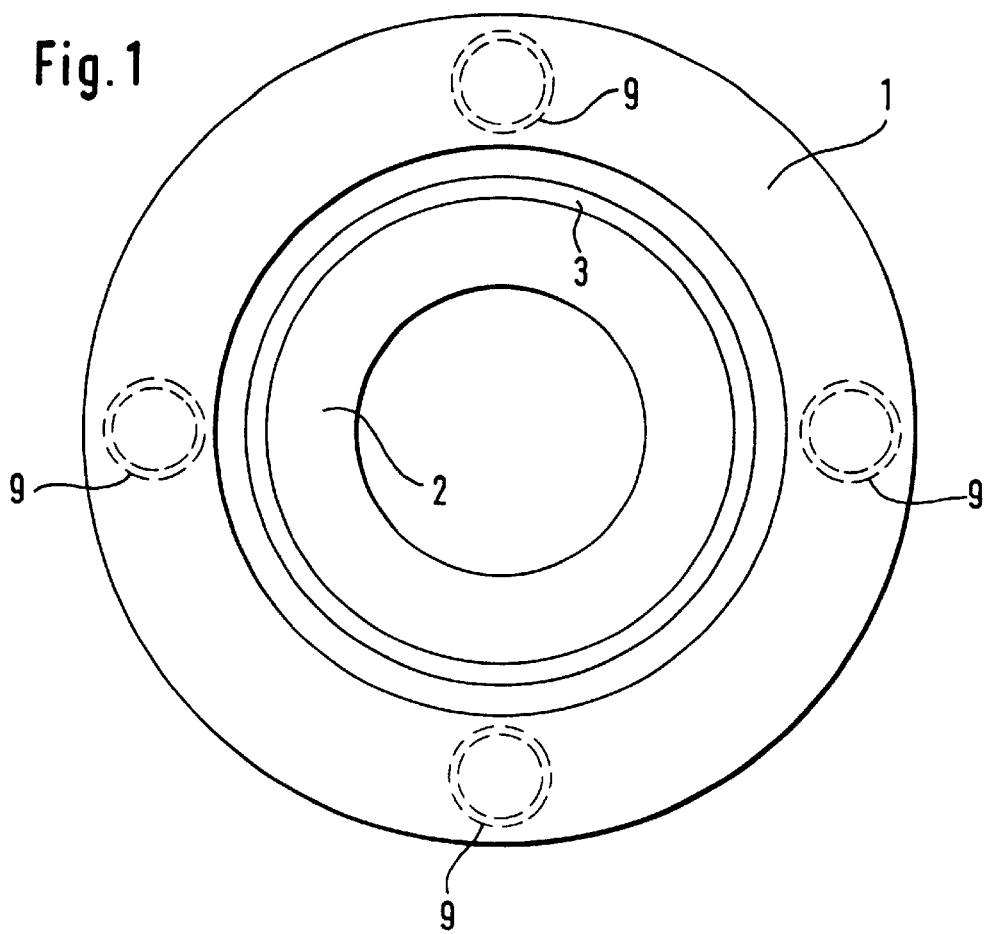
FIG. 1 a view of the annular loose flange with a detachable, gap-free sealing system.

In the schematic illustration according to FIG. 1, a first structural part 1 with four threaded bores with inner thread 9 as well as a second structural part 2 are shown wherein both structural parts are guided concentrically in the sealing area. Between the first structural part 1 and the second structural part 2 a sealing element 3 is inserted so that, as illustrated, it is exposed with a portion of its surface directly to the product chamber 5.

Figure 2:
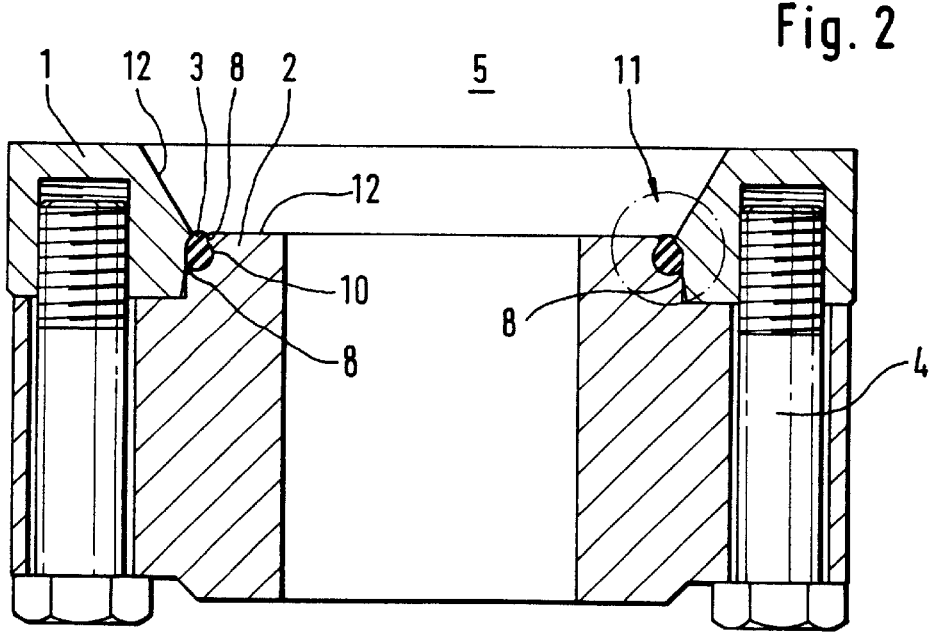
FIG. 2 a section of the annular loose flange of FIG. 1.

FIG. 2 shows the structural parts 1 and 2 screwed together by head bolts 4. The sealing element 3 is secured in the sealing surface 10 in particular via the bead-shaped burr-free transition 8 of the sealing surface 10 in the flange surface 12. As can be seen, the structural parts 1 and 2 in the sealing area are guided in a slip-in guide. When assembling the structural parts 1 and 2, the sealing element 3 is not loaded, at least not significantly, but finally by means of the sealing surface 10 of the structural part 1 by pressure and a shearing action.

Figure 3:
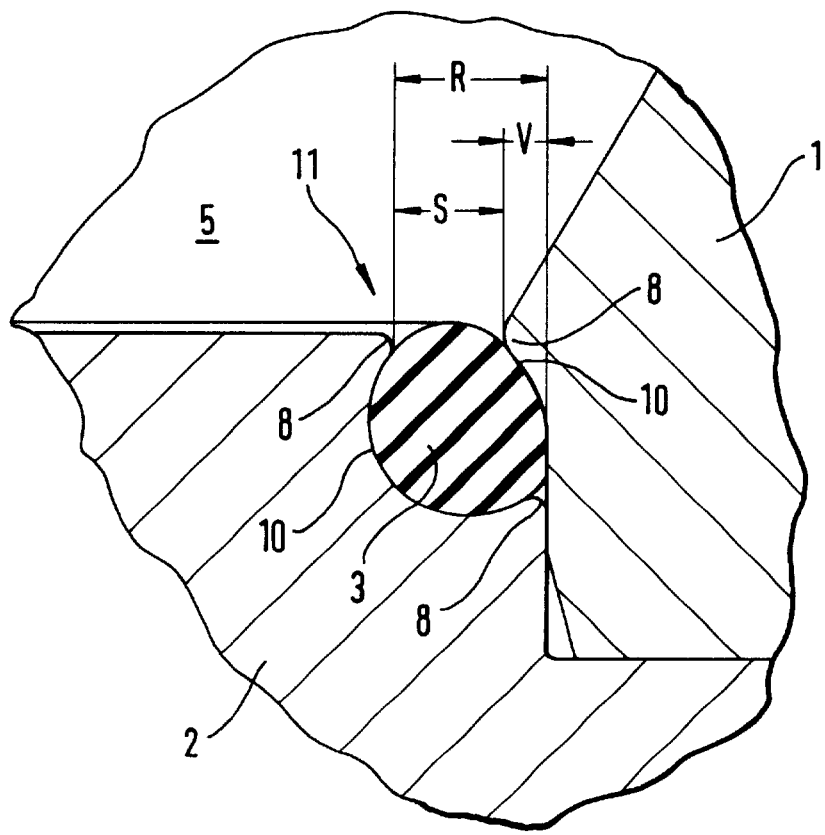
FIG. 3 the sealing area as a detail in an enlarged illustration.
Figure 4:
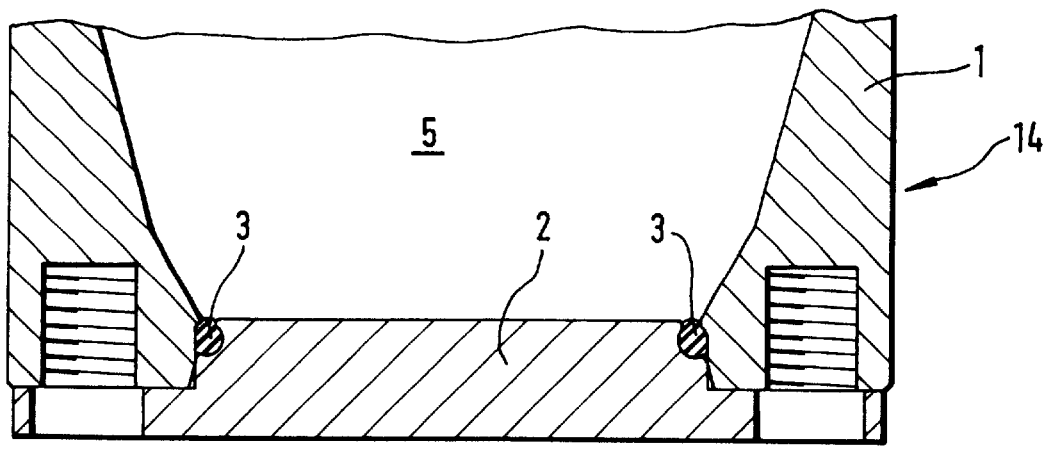
FIG. 4 a section of a detachable, gap-free sealing system between wall and bottom of a single-layer filter.

FIG. 3 shows the sealing area as a detail. As can be seen clearly, the gap-free arrangement between the structural components 1 and 2 is achieved in that the

What is claimed is:

1. A sealing system for a gap-free seal for a product chamber (5), said sealing system comprising:

a first structural part (1) having a first flange surface (12) and a first sealing surface (10);

a second structural part (2) having a second flange surface (12) and a second sealing surface (10);

wherein said first and second structural parts (1, 2) are connected to one another via said first and second flange surfaces (12) and configured to form a component of said product chamber (5);

at least one sealing element (3) inserted between said first structural part (1) and said second structural part (2) and resting against said first and second sealing surfaces (10) without a gap remaining between said first and second structural parts (1, 2);

wherein said first and second sealing surfaces (10) are turned so as to be swirl-free; and wherein said first and second flange surfaces (12) have a burr-free transition (8) into said first and second sealing surfaces (10), respectively, and wherein said burr-free transitions (8) provide a sealing line.

2. The sealing system according to claim 1, wherein said first structural part (1) and said second structural part (2) are configured to be guided in a slip-in guide and wherein said sealing element (3) is loaded by said first sealing surface (10) of said first structural part (1) with pressure and a shearing action when said first and second structural parts (1, 2) are connected seal-tightly.

3. The sealing system according to claim 2, wherein said first and second structural parts (1, 2) are connected by a loose flange arrangement.

4. The sealing system according to claim 1, wherein said sealing element (3) forms a sealing edge (11) configured to interact with said flange surfaces (12) to seal said product chamber (5).

5. The sealing system according to claim 1, wherein said burr-free transitions (8) are bead-shaped.

6. The sealing system according to claim 1, arranged between a wall (1) and a bottom (2) of a single-layer filter (14) for an aseptic sealing of said single-layer filter (14).

7. The sealing system according to claim 1, wherein said sealing element (3) is an elastomer coated with PTFE.

8. The sealing system according to claim 1, wherein said sealing element (3) is a shaped seal.

9. The sealing system according to claim 1, wherein said first sealing surface (10) of said first structural part (1) forms a projection (V) and said second sealing surface of said second structural part (2) forms a recess (R), wherein said projection (V) and said recess (R) are spaced apart at a spacing (s) when said first and second structural parts (1, 2) are connected are connected seal-tightly.

* * * * *